April 6, 1965   J. W. BORGER ETAL   3,177,042
PNEUMATIC UNLOADING ARRANGEMENT AND DEVICES THEREFOR
Filed July 12, 1961   3 Sheets-Sheet 2
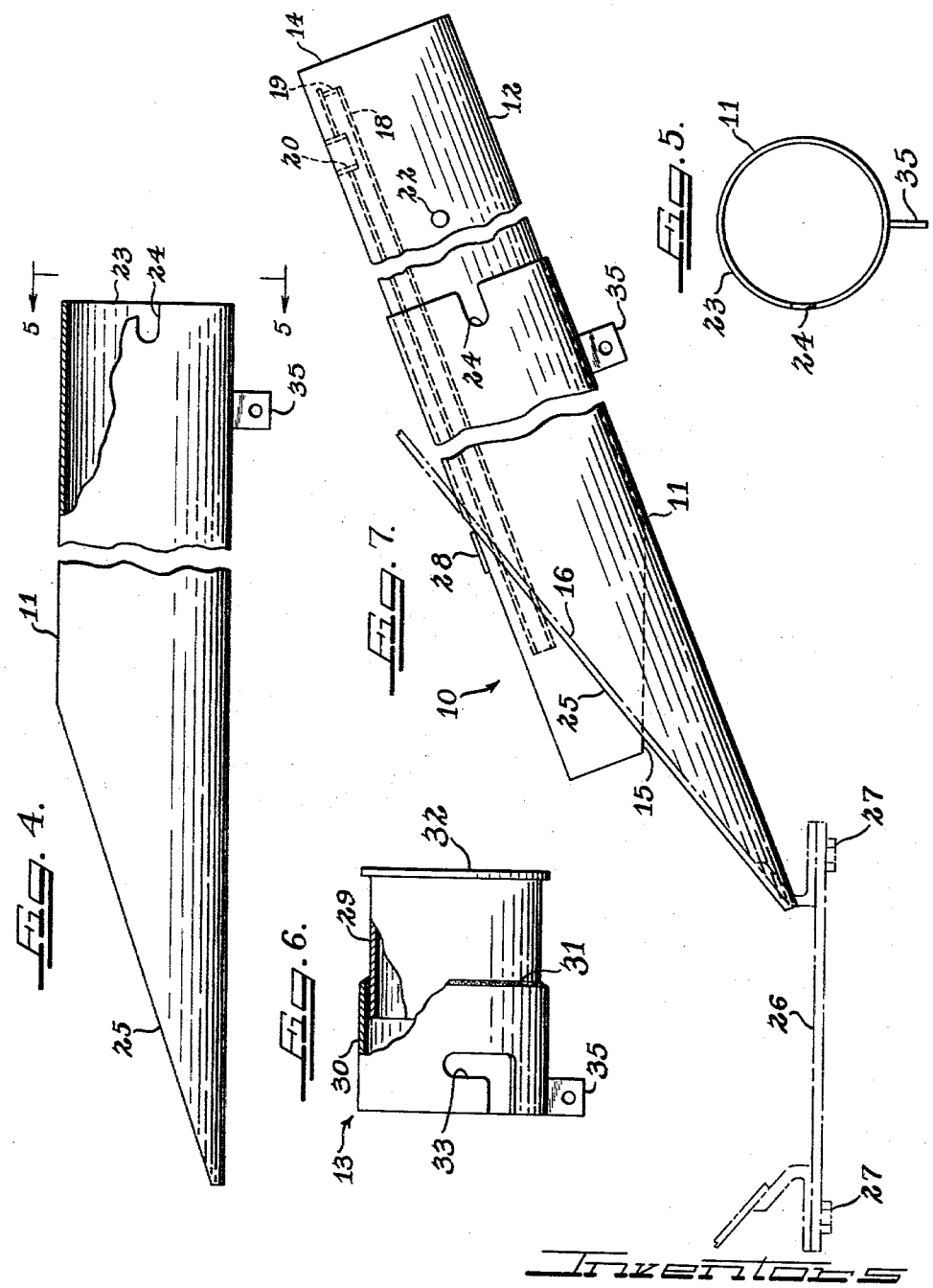
INVENTORS
JACK W. BORGER
VICTOR J. TOME
BY Cromwell, Greist & Warden ATTYS.

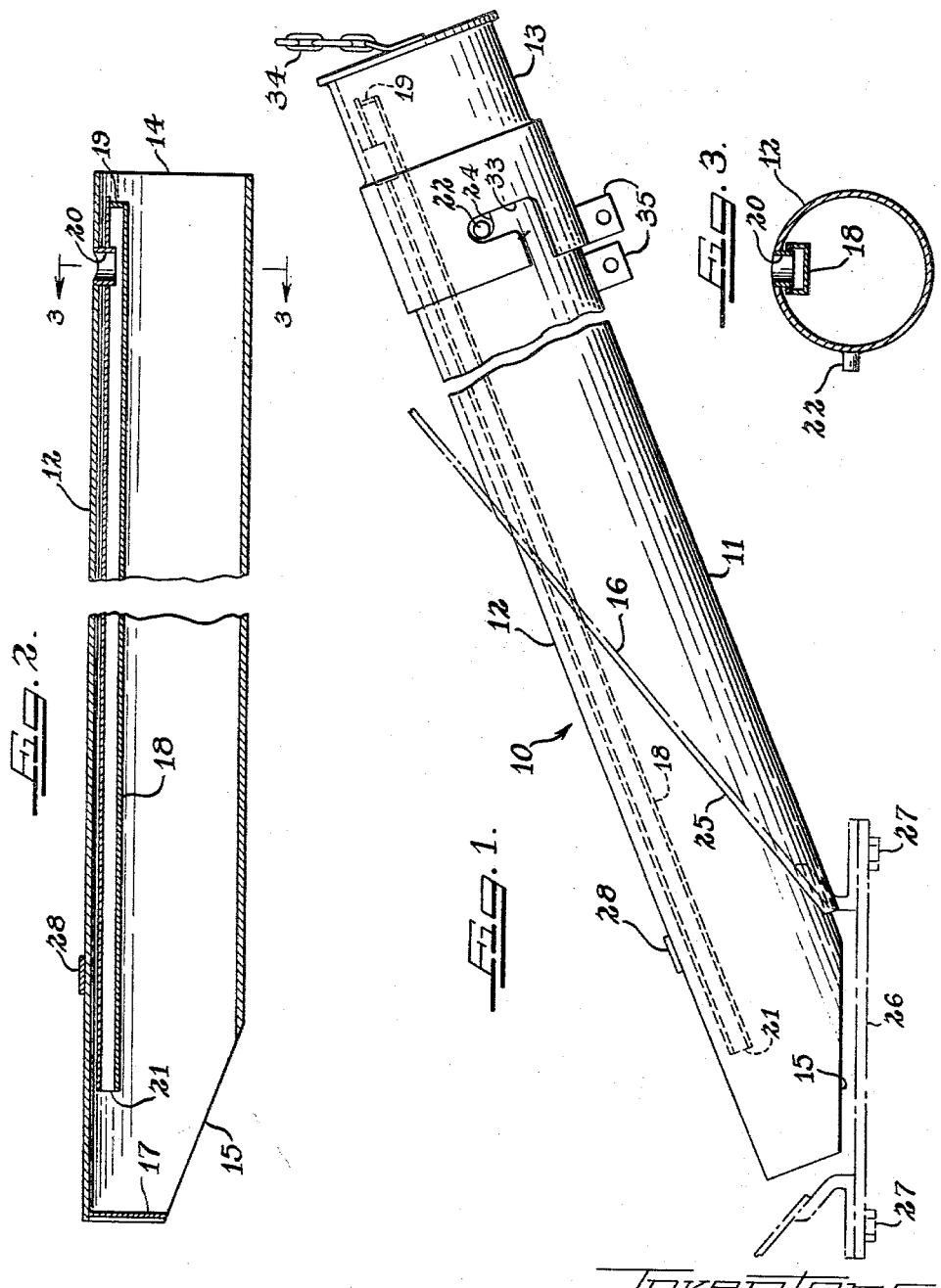

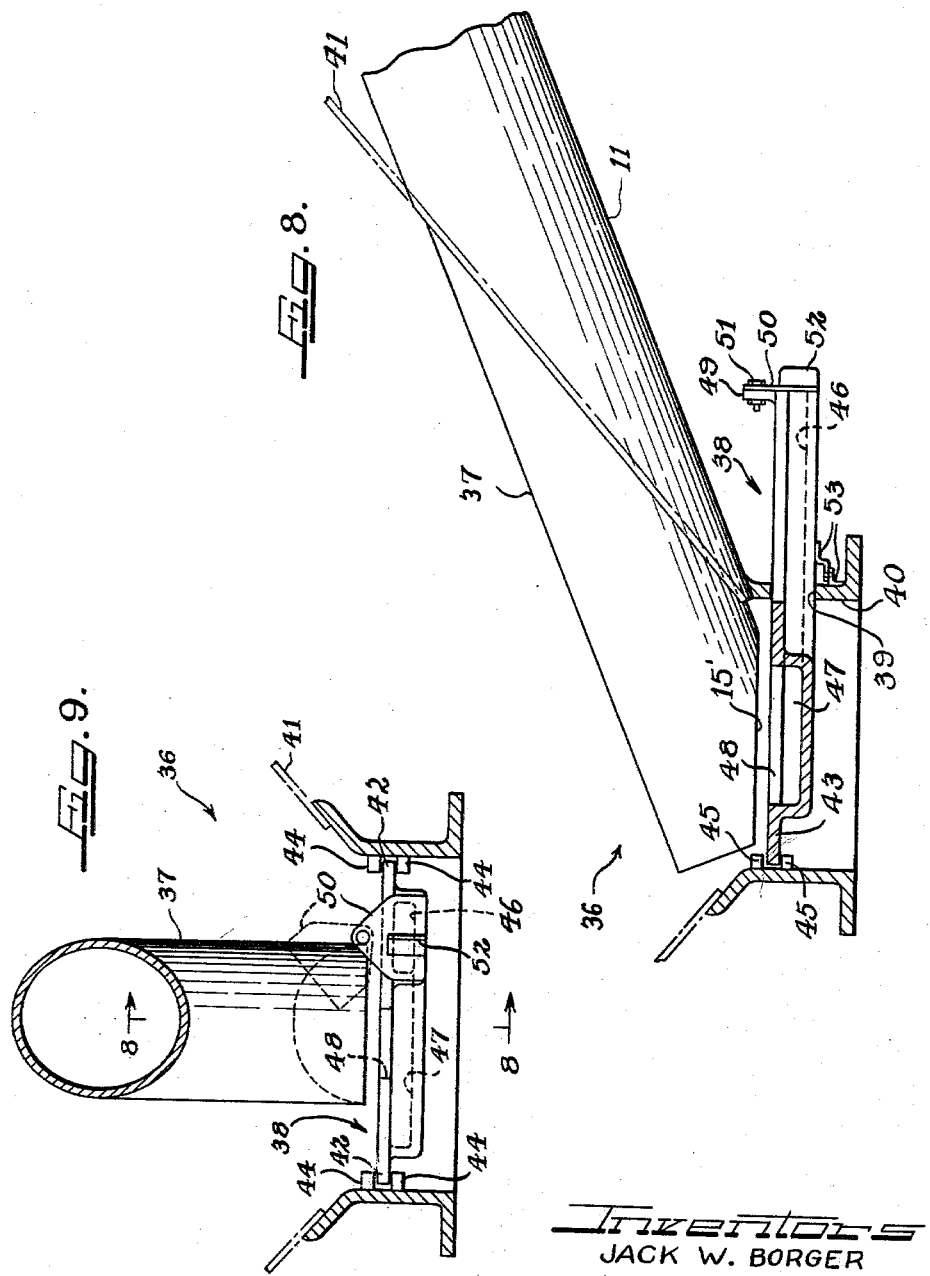

United States Patent Office 3,177,042
Patented Apr. 6, 1965

3,177,042
PNEUMATIC UNLOADING ARRANGEMENT
AND DEVICES THEREFOR
Jack W. Borger, Calumet City, and Victor J. Tome, Chicago, Ill., assignors to Pullman Incorporated, Chicago, Ill., a corporation of Delaware
Filed July 12, 1961, Ser. No. 123,534
4 Claims. (Cl. 302—58)

The invention relates to a new and improved pneumatic unloading arrangement and devices adapted for use with a hopper in the unloading of particulate material therefrom. More specifically, the invention is directed to a new and improved pneumatic unloading arrangement especially adapted for unique mounting and use on a hopper car, the arrangement including a specially arranged tube-like portion which functions with the bottom discharge end of a hopper in a new and improved manner.

Many different forms of pneumatic unloading arrangements have been proposed for use with hopper cars in the unloading of particulate material therefrom. Most of these arrangements include some sort of mechanically operating gating or valving means which function to open and close the discharge end of a hopper. Such arrangements are sometimes subject to mechanical inefficiencies depending upon the complexity of the parts thereof due to the effect of particulate material thereon. Complexity in gating and valving designs tending to overcome operational problems lead to higher costs in equipment. Versatility of use with granular materials of substantially different particle size is sometimes limited.

It is an object of the present invention to provide a new and improved pneumatic unloading arrangement and devices for use with a hopper in the unloading of a particulate material therefrom.

A further object is to provide a new and improved pneumatic unloading arrangement for hopper car use, the arrangement basically including the use of a telescopic suction tube which by reason of its design and specified manner of use eliminates the necessity of material discharge gating and valving elements thus providing improved efficiency in operation in conjunction with economies in cost.

Another object is to provide a new and improved pneumatic unloading device of telescopic design which in its use does not restrict gravity unloading while additionally permits entrance area or orifice adjustment for commodities of various particle size.

Still another object is to provide a new and improved hopper unit incorporating therein a uniquely designed and arranged pneumatic unloading arrangement of the type described in the foregoing objects.

Other objects not specifically set forth will become apparent in the following detailed description of the invention made in conjunction with the accompanying drawings wherein:

FIG. 1 is a fragmentary elevation of one form of pneumatic unloading arrangement of the invention illustrating operational mounting thereof on a conventional hopper shown in broken lines;

FIG. 2 is a longitudinal fragmentary section of the suction tube of the unloading arrangement;

FIG. 3 is a transverse section of the air inlet portion of the suction tube of FIG. 2 as viewed generally along line 3—3 therein;

FIG. 4 is a fragmentary, partly sectioned elevation of the tube sleeve of the device;

FIG. 5 is an end elevation of the tube sleeve of FIG. 4 as viewed generally along line 5—5 therein;

FIG. 6 is a partly sectioned elevation of a closure cap forming a part of the arrangement;

FIG. 7 is a fragmentary elevation similar to FIG. 1 illustrating operational use of the arrangement;

FIG. 8 is a cross sectional view of an air inlet means of a modified arrangement taken generally along line 8—8 in FIG. 9; and FIG. 9 is an end view of the air inlet means of FIG. 8 as viewed from the right therein.

The pneumatic unloading arrangement of the invention basically comprises a telescoping suction tube means which may include as a part thereof separated air inlet tube means extending longitudinally thereof and terminating adjacent the material receiving end of the suction tube means. This suction tube means is preferably mounted at an upwardly inclined angle on the bottom portion of a hopper and extends therethrough for movement into and out of a bottom discharge portion of the hopper. The arrangement further preferably includes a fixed sleeve which is mounted on the hopper and which telescopically receives therethrough the suction tube.

Referring particularly to FIG. 1, the principal elements of the pneumatic unloading device 10 are illustrated as comprising a tube sleeve 11, a suction tube 12 slidably received through the tube sleeve 11, and a closure member 13 which is in the form of a removable cap. The suction tube 12 as best shown in FIGS. 2 and 3 is generally circular in configuration and of relatively large diameter being formed from metal or any other suitable rigid material. This tube is provided with a full diameter discharge end 14 and the opposite end thereof is specially designed to provide an inverted trough-like shape adapting this end for material receiving or intake in general conformance with the design of the bottom discharge portion of a hopper. The material receiving end of the tube 12 is provided with angularly inclined edge portions 15 as a result of cutting away the tube material in a "beveling" direction along the inner bottom edge thereof. The angle of the material receiving opening defined by the edges 15 is complementary to the angle at which the tube 12 is mounted relative to the flat bottom surface portion of a hopper 16 as shown in phantom in FIG. 1. The material receiving end structure of the tube 12 is completed by the provision of a baffle plate 17 which closes off the outermost end portion of the progressively deepening U-shaped hood which, in effect, is defined by the inclined tube edges 15. By way of example, the angularity of the edges 15 relative to the longitudinal axis of the tube 12 may be approximately 22°.

An air inlet tube 18 extends longitudinally along the interior of the suction tube 12 and is mounted in close association to the top wall portion thereof with the material receiving opening defined by the tube edges 15 constituting the main point of reference. As shown in FIG. 3, the air inlet tube 18 may be of rectangular outline to provide a relatively large internal volume without substantially projecting toward the center axis of the suction tube 12 to interfere with material flow therethrough. The end of the air inlet tube 18 adjacent the discharge end 14 of the suction tube 12 is closed off by a transverse end plate 19. Inwardly of the end plate 19 is an air intake tube section 20 which is suitably fixedly mounted in an aperture extending through the top wall portion of the suction tube 12, the inner end portion of the tube section 20 extending through and being fixedly secured in a suitable aperture in the air tube 18. The tube section 20 provides a vent-like passage communicating the atmosphere with the interior of the air tube 18 for the drawing of air therethrough longitudinally of the suction tube 12 when a suction is placed on the tube 12 at the discharge end 14 thereof. The air tube 18 terminates adjacent the material receiving opening defined by the free edges 15 and the terminating end 21 thereof is fully open for air discharge therefrom. The suction tube 12 is completed with the provision of a fixedly secured, laterally projecting stud 22 the purpose of which will be described.

FIGS. 4 and 5 particularly illustrate the structural features of the tube sleeve 11. This sleeve is of generally tubular shape and is formed from any suitable material such as metal. The sleeve 11 includes a circular right angled outer end 23 which is formed with an inwardly extending, generally U-shaped groove or slot 24. The opposite end of the sleeve 11 is formed with an upper surface cut-away portion defining transversely and longitudinally inclined edges 25 adapted for fixed attachment in a suitable oval shaped opening in a converging side wall portion of a hopper 16. As shown in FIGS. 1 and 7, the sleeve 11 is fixedly secured in a hopper side wall opening by any suitable means and by reason of the inclination of its edge portions 25 the tube is directed outwardly from the hopper 16 and is inclined in an upwardly direction therefrom.

As shown in FIGS. 1 and 7, the suction tube 12 is slidably received in the fixed tube sleeve 11 for telescoping movement therein into and out of the bottom discharge portion of the hopper 16. FIG. 1 illustrates the full inward positioning of the suction tube 12, this inward extension being limited by the receiving of the stud 22 thereof in the slot 24 of the sleeve 11 in abutment with the inner rounded end of the slot. In this position the material receiving opening defined by the free edges 15 of the tube 12 is spaced slightly above the bottom flat surface of the hopper 16 which is defined by a cover plate 26 of any suitable type. This plate is removably attached to the hopper 16 by any suitable fasteners 27 in accordance with known design. The tube 12 is slidable outwardly from the hopper 16 as shown in FIG. 7 to an extent that the material receiving end portion thereof is virtually completely removed from the bottom discharge portion of the hopper 16. The extent to which the tube is removable from the hopper is controlled by a stop plate 28 fixedly secured to the top outer surface portion thereof and arranged for abutment with an edge portion of the sleeve 11. The air tube 18 being fixed to the tube 12 moves with the same at all times.

The assembly is completed by the provision of a closure member in the form of a cap 13 which, as best shown in FIG. 6, is formed from a pair of partially telescoped tube sections 29 and 30. The outer tube section 29 of smaller diameter is slightly received within the outer end of the tube section 30 and these sections are fixedly secured such as by a weld 31. The outermost end of the tube section 29 is closed off by a transverse plate 32 secured thereto. The innermost edge of the tube section 30 is formed with a bayonet-type slot 33 designed to receive the stud 22 of the tube 12 therein for locking of the cap 13 on the tube 12. The cap in its locked position on the tube 12 and sleeve 11 is illustrated in FIG. 1. The end plate 32 of the cap 13 may have suitably secured thereto a chain 34 connected at its other end to a portion of a hopper car to prevent misplacing of the cap during hopper unloading. Both the cap 13 and sleeve 11 are provided with outwardly projecting apertured tabs 35 which cooperatively function to receive a known type of car seal (not shown) during material shipment.

In operating the device 10 in the position shown in FIG. 1, the cap 13 is removed exposing the material discharge end 14 of the suction tube 12. It will be noted that the length of the tube 12 and the position of the stud 22 thereof is such that the discharge end including the air inlet tube section 20 is exposed when the cap is removed. A suitable suction line in the form of a hose or the like (not shown) is received about the discharge end of the tube 12 in such a manner that the air inlet tube section 20 remains exposed to the atmosphere. A vacuum is drawn in the attached suction line through the tube 12 into the bottom of the hopper 16 and air at a relatively high velocity, due to the relative cross sections of the air tube 18 and the material flow tube 12, is drawn into the tube 12 adjacent the material receiving end thereof. This high velocity air flow through the tube 12 of the material receiving end thereof out through the material discharge end thereof results in the picking up of the particulate material in the bottom of the hopper 16 and the movement thereof from the hopper through the tube 12. As previously described, the material receiving opening of the tube 12 defined by the free edges 15 is spaced above the bottom surface of the hopper 16 and the arcuate outer surface of the tube 12 presented in the hopper 16 functions as baffle means to direct material downwardly below the tube 12 into the material receiving opening. The particular shape of the material receiving end of the tube 12 provides for efficient and complete material removal from the hopper 16.

Movement of the suction tube 12 in the sleeve 11 in a direction out of the hopper 16 to a variable extent will result in a raising of the material receiving opening defined by the free edges 15 relative to the bottom of the hopper 16. The extent to which the material receiving end of the tube 12 may be raised in the hopper is illustrated in FIG. 7. Intermediate raised positions of the tube 12 provides to discharge accommodation of commodities of various particle size. In other words, the material receiving opening of the tube 12 moves upwardly during tube withdrawal thus increasing the space between the same and the bottom of the hopper to accommodate material of larger particle size. Extreme withdrawal of the tube 12 from the hopper 16 as limited by the stop plate 28 as shown in FIG. 7 virtually clears the tube from the hopper and permits unimpeded gravity discharge of material therefrom by removal of the bottom plate 26. In this manner the special unloading device of the present invention readily accommodates gravity discharge where desired in a very simple and efficient manner.

An additional advantage resides in the design of the suction tube 12 adapting the same to receive an unloading hose about the outer surface thereof as distinguished from requiring the insertion of such a hose into the interior of the tube. This completely eliminates commodity damage caused by the material striking the edge of the hose received in the tube. Furthermore, the unloading hose may be moved inwardly along the tube 12 at least partially over the air intake tube section 20 to provide adjustment of the velocity of air drawn into the device. The particular arrangement of the air inlet means permits this unique type of operation. The telescoped tube sections used in forming the cap 13 provide for abutment of the smaller tube section 29 with the outer end 23 of the sleeve 11, the tube section 29 receiving therein the projecting discharge end 14 of the tube 12 as shown in FIG. 1 with this end in abutment with the inner surface of the end plate 32. With the car seal in place, the tube 12 is held tightly against movement during operation of a hopper car.

FIGS. 8 and 9 illustrate a modified pneumatic unloading arrangement which makes use of a suction tube 37 which is basically similar to the tube 12 previously described but which does not include longitudinally extending air inlet tube means 18 as a part thereof. To provide a quantity of air for material unloading purposes, the arrangement 36 involves the use of a special air inlet means in the form of a sliding gate member 38. This gate member is formed from a specially designed plate slidably received through an opening 39 in a bottom side wall portion 40 of the discharge end of a hopper 41. The gate member 38 includes opposite side flanges 42 and an inner end flange 43. The side flanges 42 are received between confining track members 44 of known type mounted in the interior of the discharge end of the hopper 41. The inner end flange 43 is adapted to be received between sealing members 45 of known type which are mounted on the inner surface of a wall portion of the discharge end of the hopper opposite the opening 39.

The gate member 38 mounted in the manner described is adapted for sliding movement across the bottom discharge end of the hopper 41 thus permitting gravity discharge of the material from within the hopper 41 if desired. A removable bottom cover plate similar to the plate 26 previously described may also be added to the lowermost surface of the discharge end of the hopper. With the gate member 38 being provided with air supply means of the type to be described, the material discharge tube 37 is merely in the form of a plain tube such as tube 12 previously described and is not provided with the internal longitudinally extending air inlet tube 18. In all other respects the tube 37 may be of the same design including the free edges 15′ which provide the material receiving inner end of the tube 37 with an inverted trough-like shape, the free edges 15′ being in close association immediately above the top surface of the portion of the gate member 38 received within the discharge end of the hopper 41. The tube 37 is mounted in the hopper 41 for telescopic movement to permit adjustment to material particle size as well as permit adequate withdrawal thereof from the hopper 41 for gravity discharge of material from the hopper.

The gate member 38 provides air inlet control means in the form of internal passage means through which air can flow from a point externally of the hopper 41 into the discharge end thereof directly below the material receiving end of the suction tube 37. As best shown in FIG. 9, the outer end of the gate member 38 located externally of the hopper 41 is formed with an internal passage 46 which is located to one side of the longitudinal center line of the gate member to position the same toward one side of the hopper 41. The outer end of the passage 46 is in communication with the outer end surface of the gate member 38 and this passage extends inwardly beyond the opening 39 into communication with a transverse passage 47 formed in the gate member generally centrally of the discharge end of the hopper and directly below the material receiving end of the suction tube 37. The combined passages 46 and 47 are of generally L-shape. The transverse passage portion 47 is in communication with a centrally located window-like opening 48 extending upwardly through the top surface of the portion of the gate member received in the hopper. The opening 48 is located directly below the material receiving end of the suction tube 37. The combined passages and opening 48 provide for the flow of air from a point externally of the hopper into the discharge end of the hopper and upwardly into the material receiving end of the suction tube 37. A drawing of a vacuum on the tube 37 provides for the flow of air through the gate member 38 with the result that material is picked up by the air flow and discharged through the tube 37.

The top surface of the outer end portion of the gate member 38 directly over the outer end of the air flow passage 46 is formed with an upstanding boss 49 to which is pivotally attached a plate-like valve means 50. This valve is formed with an upper apertured portion through which a suitable fastener 51 is received by means of which the valve is pivotally attached to the boss 49. The lower portion of the valve 50 is of generally rectangular shape and is dimensioned to be receivable over the outer end of the air flow passage 46 in fully covering relation thereto to seal off the same. The outer surface of the valve 50 is provided with an outwardly projecting flange 52 adapted to be grasped by an operator to lift the same into an inoperative position as shown in broken lines in FIG. 9 thus placing the interconnected air flow passages in communication with the atmosphere. Suitable apertured tabs 53 may be cooperatively mounted on the gate member 38 and hopper 41 for the attachment of a car seal thereto. Such an arrangement can also provide the function of holding the gate member in closed position within the hopper 41 during operation of the car. Any other suitable means may also be used.

The arrangement of FIGS. 8 and 9 provides for air delivery through means other than the suction tube 37 thus permitting full capacity use of the tube 37. The air passage 46 is of smaller area than the air passage 47 to permit an increase in air inlet velocity during operative use of the arrangement. The passage 46 and valve 50 are positioned to one side of the gate member 38 as shown in FIG. 9 to permit ready access to the valve 50 from a side of the hopper car.

Obviously certain modifications and variations of the invention as hereinbefore set forth may be made without departing from the spirit and scope thereof, and therefore only such limitations should be imposed as are indicated in the appended claims.

We claim:

1. In combination, a hopper and a pneumatic unloading device mounted on said hopper and extending into the bottom portion thereof for the removal of particulate material therefrom, said unloading device comprising a sleeve extending externally from said hopper and communicating with the interior of said hopper through an opening therein, a suction tube telescopically received through said sleeve and provided with material intake and discharge ends, said suction tube being slidable in said sleeve to provide for movement of the intake end thereof into and out of the bottom portion of said hopper, and air supply means in said tube extending longitudinally thereof, said air supply means being in the form of a conduit having an open discharge end adjacent the intake end of said tube and an air intake opening in the opposite end of said conduit extending through a wall portion of said tube.

2. In combination, a hopper and a pneumatic unloading device mounted on said hopper and extending into the bottom portion thereof for the removal of particulate material therefrom, said unloading device comprising a sleeve extending externally from said hopper and communicating with the interior of said hopper through an opening therein, a suction tube telescopically received through said sleeve and provided with material intake and discharge ends, said suction tube being slidable in said sleeve to provide for movement of the intake end thereof into and out of the bottom portion of said hopper, and air supply means in said tube extending longitudinally thereof, said air supply means being in the form of a conduit having an open discharge end adjacent the intake end of said tube and an air intake opening in the opposite end of said conduit extending through a wall portion of said tube, the intake end of said tube being angularly cut away along the bottom thereof to define an inverted U-shaped hood-like portion.

3. In combination, a hopper and a pneumatic unloading device mounted on said hopper and extending into the bottom portion thereof for the removal of particulate material therefrom, said unloading device comprising a sleeve extending externally from said hopper in an upwardly inclined direction and communicating with the interior of said hopper through an opening therein, a suction tube telescopically received through said sleeve and provided with material intake and discharge ends, said suction tube being slidable in said sleeve to provide for movement of the intake end thereof into and out of the bottom portion of said hopper, stop means extending between said tube and sleeve to limit the extent of movement of said tube in either direction in said sleeve, the intake end of said tube being angularly cut away along the bottom thereof to define an inverted U-shaped hood-like portion, air supply means in said tube extending longitudinally thereof, said air supply means being in the form of a conduit having an open discharge end adjacent the intake end of said tube and an air intake opening in the opposite end of said conduit extending through a wall portion of said tube, and closure means on the discharge end of said tube.

4. In combination, a hopper and a pneumatic unloading device mounted on said hopper and extending into the bottom portion thereof for the removal of particulate material therefrom, the bottom portion of said hopper extending transversely thereof and providing a generally horizontal material receiving surface portion within said hopper, said unloading device comprising a material discharge suction tube means extending externally from said hopper in upwardly inclined relation and having an innermost material receiving end in communication with the interior of said hopper through an opening in a side wall portion of said hopper, means mounting said tube means through said opening for telescopic movement thereof into and out of said hopper and movement of the material receiving end toward and away from the horizontal surface portion of said bottom portion, the material receiving end of said tube means movable within said hopper being angularly cut away and defining a horizontally extending hood portion of inverted trough-like shape, said material receiving end closely and substantially overlying the horizontal surface portion of said bottom portion in the innermost position of said tube means, the outermost end of said tube means including means for attachment to suction means for removal of material from said hopper; and air supply means forming a part of said suction tube means and including air inlet tube means extending longitudinally of said suction tube means and terminating adjacent the material receiving end of said suction tube means, the termination of said air inlet tube means being located within said material receiving end.

References Cited by the Examiner

UNITED STATES PATENTS

| | | | |
|---|---|---|---|
| 1,530,654 | 3/25 | Daley | 302—58 |
| 2,190,726 | 2/40 | McKenna | 302—58 |
| 2,303,810 | 12/42 | Anderson | 302—52 |
| 2,744,286 | 5/56 | Carpenter | 302—58 |
| 2,745,563 | 5/56 | Dath | 302—52 |
| 2,831,732 | 4/58 | Rieser | 302—58 |
| 2,919,158 | 12/59 | Aller | 302—52 |
| 2,962,325 | 11/60 | Dorey | 302—52 |
| 3,031,233 | 4/62 | Pendleton | 302—58 |

FOREIGN PATENTS 849,008 9/60 Great Britain.

ERNEST A. FALLER, *Primary Examiner.*

ANDRES H. NIELSEN, *Examiner.*